(12) United States Patent
Rakshit et al.

(10) Patent No.: US 11,825,212 B2
(45) Date of Patent: Nov. 21, 2023

(54) AUTOMATIC CREATION OF A TILED IMAGE BASED ON USER INTERESTS

(71) Applicant: INTERNATIONAL BUSINESS MACHINES CORPORATION, Armonk, NY (US)

(72) Inventors: Sarbajit K. Rakshit, Kolkata (IN); Jonathan Lenchner, North Salem, NY (US); Reha Yurdakul, Izmir (TR); Stephen Oduor Odhiambo, Nairobi (KE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/451,196

(22) Filed: Oct. 18, 2021

(65) Prior Publication Data
US 2023/0123913 A1    Apr. 20, 2023

(51) Int. Cl.
*H04N 23/951*    (2023.01)
*G06F 16/583*    (2019.01)
*H04N 23/698*    (2023.01)

(52) U.S. Cl.
CPC ....... *H04N 23/951* (2023.01); *G06F 16/5846* (2019.01); *G06F 16/5854* (2019.01); *H04N 23/698* (2023.01)

(58) Field of Classification Search
CPC ........... H04N 5/23232; H04N 5/23238; H04N 23/951; H04N 23/698; G06F 16/5846; G06F 16/5854
See application file for complete search history.

(56) References Cited

U.S. PATENT DOCUMENTS 9,355,432 B1 * 5/2016 Goldman ............. G06V 10/462
10,102,219 B2   10/2018 Ebberson
(Continued)

FOREIGN PATENT DOCUMENTS

JP    2016125913 A    7/2016
JP    2018000102 A    1/2018

OTHER PUBLICATIONS

B&H Photo Video, "Motorized Pan and Tilt Video Heads", Professional's Source Since 1973, 11 Pages, https://www.bhphotovideo.com/c/buy/pan-tilt-heads/ci/24941/N/3907816572.
(Continued)

*Primary Examiner* — Shahbaz Nazrul
(74) *Attorney, Agent, or Firm* — Robert R. Aragona

(57) ABSTRACT

An embodiment for creating a tiled image using different zoom levels based on user interests is provided. The embodiment may include receiving one or more photographs captured by a user. The embodiment may also include analyzing features associated with the one or more photographs. The embodiment may further include identifying one or more known objects of interest. The embodiment may also include in response to determining the user wants to take a tiled zoom photograph, capturing a photographic image. The embodiment may further include scanning the photographic image for identifying features of the one or more known objects of interest. The embodiment may also include in response to determining at least one object of interest is found in the scanned photographic image, assembling the tiled zoom photograph with a plurality of tiles.

20 Claims, 14 Drawing Sheets

(56) References Cited

U.S. PATENT DOCUMENTS

| | | | |
|---|---|---|---|
| 10,139,937 B2 | 11/2018 | Khosravy | |
| 10,218,901 B2* | 2/2019 | Hao | H04N 23/695 |
| 10,735,671 B2* | 8/2020 | Marman | H04N 7/183 |
| 2004/0187004 A1 | 9/2004 | Ray | |
| 2009/0268943 A1* | 10/2009 | Yoshizumi | G06T 7/60 |
| | | | 382/103 |
| 2010/0002070 A1* | 1/2010 | Ahiska | H04N 23/81 |
| | | | 348/E7.001 |
| 2011/0149120 A1* | 6/2011 | Kubota | H04N 23/69 |
| | | | 348/240.99 |
| 2013/0016128 A1 | 1/2013 | Bhatt | |
| 2014/0104197 A1 | 4/2014 | Khosravy | |
| 2016/0342620 A1 | 11/2016 | Ebberson | |
| 2017/0041529 A1* | 2/2017 | Park | H04N 23/62 |
| 2017/0184858 A1 | 6/2017 | Nohara | |
| 2017/0318226 A1* | 11/2017 | Jung | H04N 23/632 |
| 2019/0095465 A1* | 3/2019 | Zhai | G06F 16/532 |

OTHER PUBLICATIONS

Saini, et al., "sZoom: A Framework for Automatic Zoom into High Resolution Surveillance Videos", Sep. 23, 2019, 17 Pages. Website: https://arxiv.org/pdf/1909.10164.pdf.

Mell et al., "The NIST Definition of Cloud Computing", Recommendations of the National Institute of Standards and Technology, NIST Special Publication 800-145, Sep. 2011, 7 pages.

\* cited by examiner

```
700

{
    "tiles": [{
        "offset": {
            "x": 10,
            "y": 100
        },
        "dimensions": {
            "width": 30,
            "height": 30
        },
        "detected_objects": ["cliff face", "lions", "vultures"],
        "zoom_level": 5
    },{
        "offset": {
            "x": 100,
            "y": 120
        },
        "dimensions": {
            "width": 10,
            "height": 10
        },
        "detected_objects": ["warthogs"],
        "zoom_level": 20
    },
    ...
    ]
}
```

FIG. 7A

```
{
    "offset": {
        "x": 500,
        "y": 80
    },
    "dimensions": {
        "width": 8,
        "height": 8
    },
    "detected_objects": ["water buffalo"],
    "zoom_level": 25
},
{
    "offset": {
        "x": 130,
        "y": 170
    },
    "dimensions": {
        "width": 18,
        "height": 18
    },
    "detected_objects": ["giraffes"],
    "zoom_level": 15
},
```

FIG. 7B

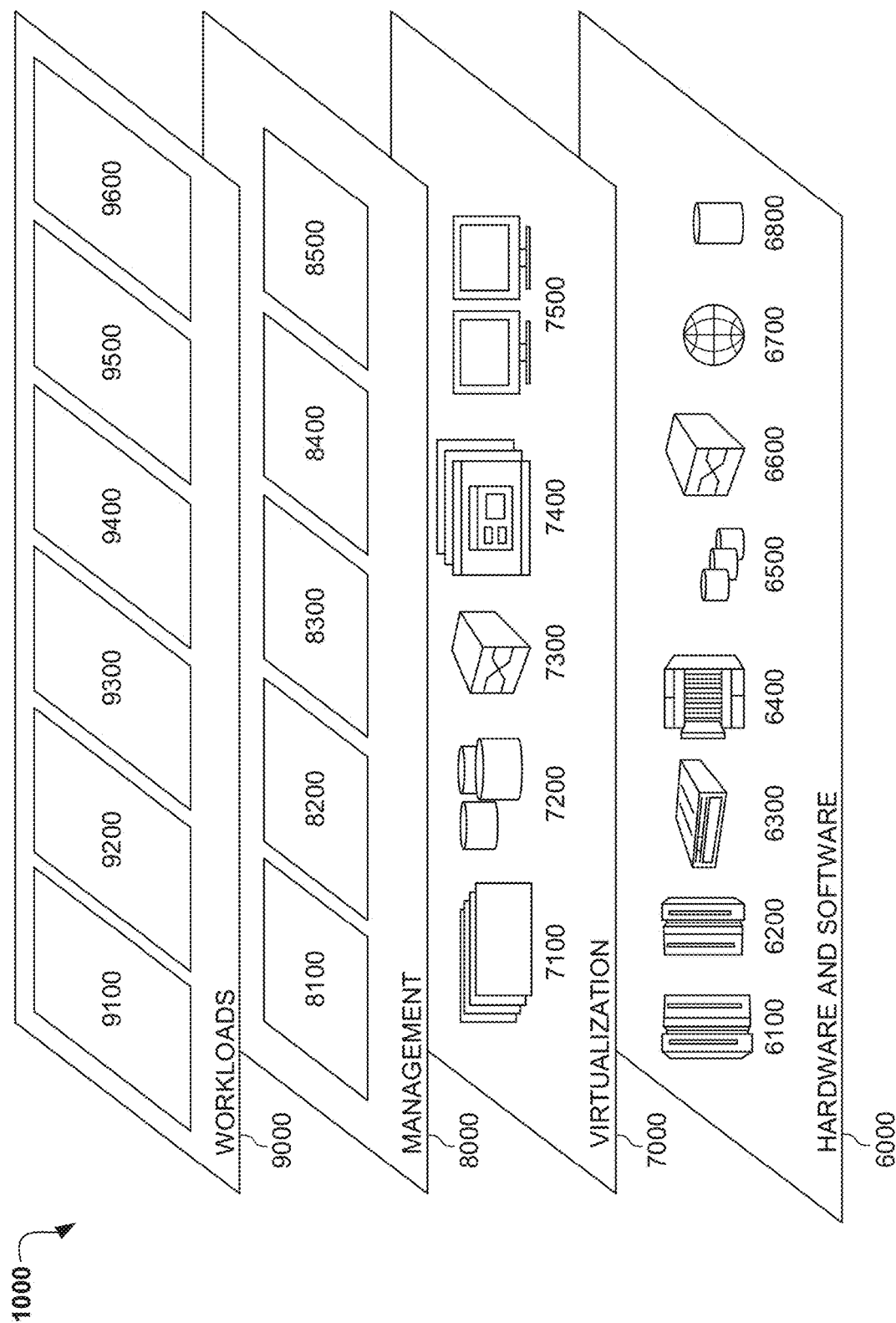

AUTOMATIC CREATION OF A TILED IMAGE BASED ON USER INTERESTS

BACKGROUND

The present invention relates generally to the field of computing, and more particularly to a system for creating a tiled image using different zoom levels based on user interests.

Photography relates to the field of capturing images by recording light, or other electromagnetic radiation, through an electronic capture device. A photographic capture device relates to any device capable of receiving light through an optical sensor and generating an image based on the light pattern captured by the optical sensor. A photographic capture device may also be communicatively coupled with a user device where the primary purpose of the user device may not be for photographic capture, such as a smartphone. Common photographic capture devices may include a still image and video camera of various sizes and quality. With these photographic capture devices, a user is able to capture photographic images in a scenic environment.

SUMMARY

According to one embodiment, a method, computer system, and computer program product for creating a tiled image using different zoom levels based on user interests is provided. The embodiment may include receiving one or more photographs captured by a user. The embodiment may also include analyzing features associated with the one or more photographs. The embodiment may further include identifying one or more known objects of interest based on the analyzed features. The embodiment may also include in response to determining the user wants to take a tiled zoom photograph, capturing a photographic image. The embodiment may further include scanning the photographic image for identifying features of the one or more known objects of interest. The embodiment may also include in response to determining at least one object of interest is found in the scanned photographic image, assembling the tiled zoom photograph with a plurality of tiles. Each tile may include a zoomed photograph of each object of interest.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIGS. 7A, 7B, and 7C are a diagram depicting a sample tiled zoom descriptor file of the tiled zoom descriptor component in FIG. 5B according to at least one embodiment.

FIG. 10 depicts abstraction model layers according to an embodiment of the present invention.

DETAILED DESCRIPTION

Figure 1:
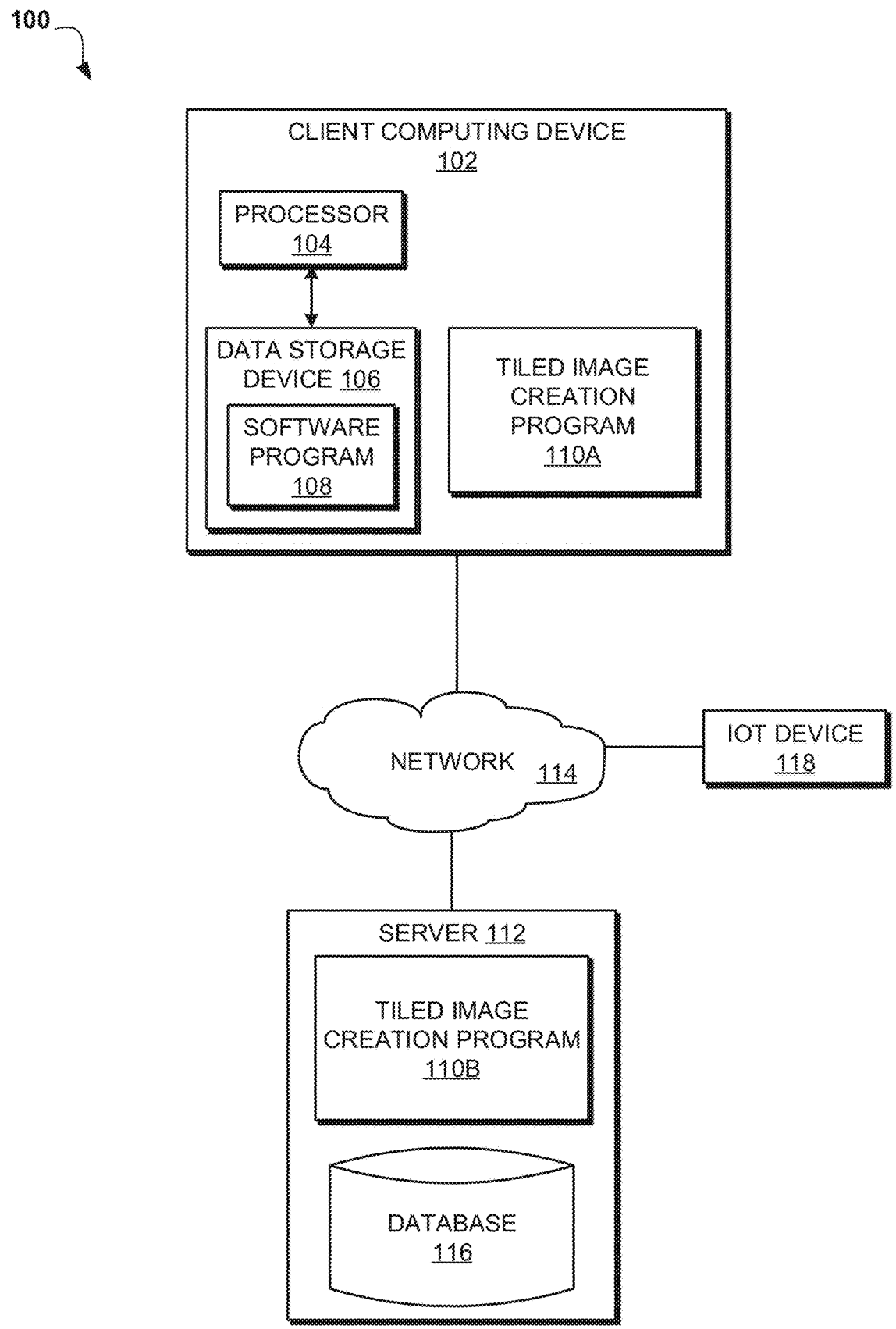
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to a system for creating a tiled image using different zoom levels based on user interests. The following described exemplary embodiments provide a system, method, and program product to, among other things, assemble a tiled zoom photograph of a photographic image based on objects of interest and, accordingly, present the tiled zoom photograph to the user. Therefore, the present embodiment has the capacity to improve the technical field of photographic capture devices by capturing high resolution images of objects of interest at different zoom levels from a single photograph based on user preferences, thereby conserving system resources by obviating the need to manually capture multiple photographs where each photograph is zoomed-in on a different object of interest. Additionally, the present embodiment has the capacity to save the user time in that the user does not need to zoom-in to multiple areas of a large scene.

As previously described, photography relates to the field of capturing images by recording light, or other electromagnetic radiation, through an electronic capture device. A photographic capture device relates to any device capable of receiving light through an optical sensor and generating an image based on the light pattern captured by the optical sensor. A photographic capture device may also be communicatively coupled with a user device where the primary purpose of the user device may not be for photographic capture, such as a smartphone. Common photographic capture devices may include a still image and video camera of various sizes and quality. With these photographic capture devices, a user is able to capture photographic images in a scenic environment. When capturing a photographic image of a large scene, such as a panoramic view, the individual objects may be blurry or barely visible. For example, a photographic image of a mountain range may not contain a clear image of wildlife or trees captured in the photograph. This problem is typically addressed by the user manually capturing multiple photographs where each photograph is zoomed-in on a different object of interest. However, manually capturing multiple photographs is a slow process and wastes the user's time. It may therefore be imperative to have a system in place to take a single photograph of a scene and present a user with a high resolution tiled zoom photograph. Thus, embodiments of the present invention may provide advantages including, but not limited to, enabling a user to zoom-in on a previously taken tiled image in high resolution, giving feedback to the system regarding whether the tiled image is interesting or not, and the system then learning from user feedback. The present invention does not require that all advantages need to be incorporated into every embodiment of the invention.

According to at least one embodiment, when a user is taking pictures with a photographic capture device, one or more photographs may be received. Upon receiving the one or more photographs, features associated with the one or more photographs may be analyzed in order to identify one or more known objects of interest based on the analyzed features. According to at least one other embodiment, text written by the user may also be used to identify the one or more known objects of interest. According to at least one further embodiment, browsing and/or search history of the user may further be used to identify the one or more known objects of interest. In response to determining the user wants to take a tiled zoom photograph, a photographic image may be captured so that identifying features of the one or more known objects of interest may be scanned. In response to determining at least one object of interest is found in the scanned photographic image based on the one or more known objects of interest, a tiled zoom photograph may be assembled with a plurality of tiles. Upon assembling the tiled zoom photograph, the tiled zoom photograph may be presented to the user with the plurality of tiles in order to receive feedback about the tiled zoom photograph from the user.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to assemble a tiled zoom photograph of a photographic image based on objects of interest and, accordingly, present the tiled zoom photograph to the user.

Referring to FIG. 1, an exemplary networked computer environment 100 is depicted, according to at least one embodiment. The networked computer environment 100 may include client computing device 102, a server 112, and Internet of Things (IoT) Device 118 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a tiled image creation program 110A and communicate with the server 112 and IoT Device 118 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 5, the client computing device 102 may include internal components 502a and external components 504a, respectively.

The server computer 112 may be a laptop computer, netbook computer, personal computer (PC), a desktop computer, or any programmable electronic device or any network of programmable electronic devices capable of hosting and running a tiled image creation program 110B and a database 116 and communicating with the client computing device 102 and IoT Device 118 via the communication network 114, in accordance with embodiments of the invention. As will be discussed with reference to FIG. 5, the server computer 112 may include internal components 502b and external components 504b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

IoT Device 118 includes a photographic capture device, such as a smartphone with a still image and video camera, or a camera external to the client computing device 102. The IoT Device 118 may also include any other image capturing device, such as that used in microscopy as well as x-ray, CT-scanning, MRI, ultrasound, and/or PET scanning that is capable of connecting to the communication network 114, and transmitting and receiving data with the client computing device 102 and the server 112.

According to the present embodiment, the tiled image creation program 110A, 110B may be a program capable of receiving one or more photographs captured by a user, creating a tiled zoom photograph of a photographic image based on objects of interest, presenting the tiled zoom photograph to the user, enabling the user to zoom-in on a tiled image in high resolution, and learning from prior user feedback. The tiled image creation method is explained in further detail below with respect to FIGS. 2A and 2B.

Figure 2A:
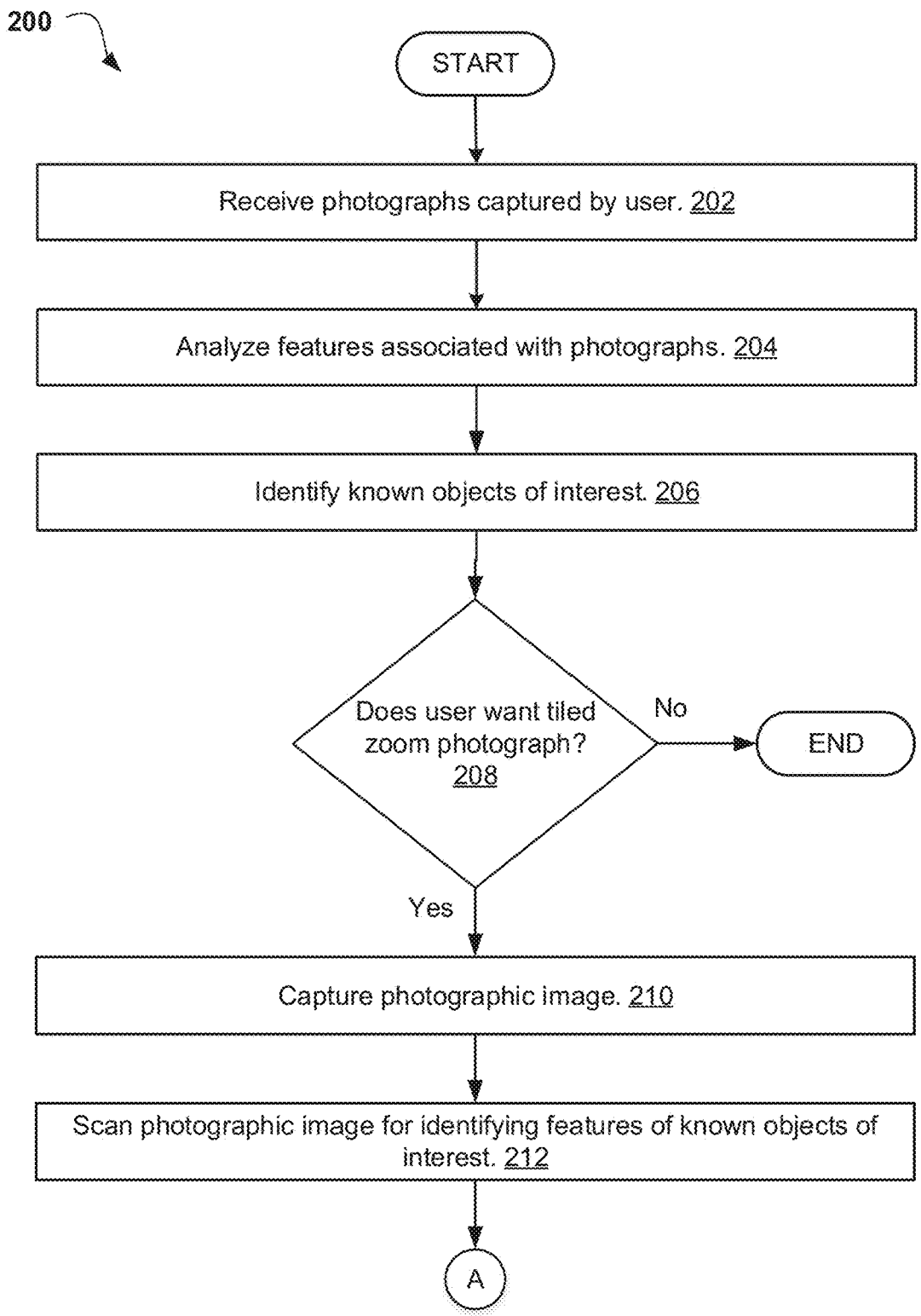
FIGS. 2A and 2B illustrate an operational flowchart for creating a tiled image using different zoom levels based on user interests in an automatic tiled image creation process according to at least one embodiment.
Figure 2B:
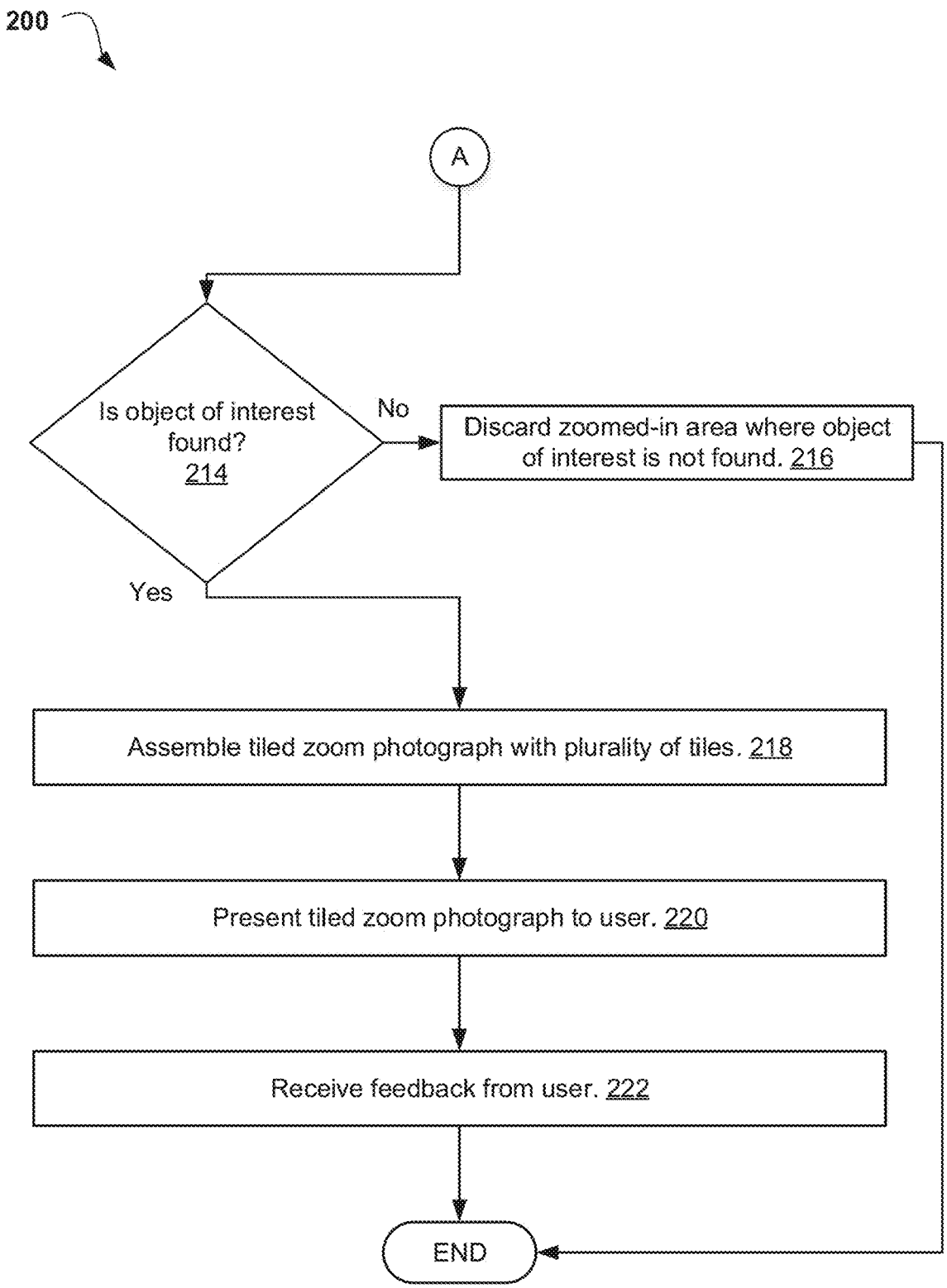

Referring now to FIGS. 2A and 2B, an operational flowchart for creating a tiled image using different zoom levels based on user interests in an automatic tiled image creation process 200 is depicted according to at least one embodiment. At 202, the tiled image creation program 110A, 110B receives the one or more photographs captured by the user. Using the software program 108 on the client computing device 102, the one or more photographs may be received. As described above, the IoT Device 118 includes a photographic capture device, such as a smartphone with a still image and video camera, or a camera external to the client computing device 102. The IoT Device 118 may also include any other image capturing device, such as that used in microscopy as well as x-ray, CT-scanning, Mill, ultrasound, and/or PET scanning that is capable of connecting to the communication network 114. Using this photographic capture device, the user may take the one or more photographs of objects they find interesting. For example, the user may take one or more photographs of wildlife, birds, mountain ranges, automobiles, and food, among other objects.

These photographs may then be analyzed, described in further detail below with respect to step 204.

Then, at 204, the tiled image creation program 110A, 110B analyzes the features associated with the one or more photographs. Utilizing known image recognition and computer vision techniques, the tiled image creation program 110A, 110B may analyze the features of the one or more photographs. As described above with respect to step 202, the user may take one or more photographs of wildlife, birds, mountain ranges, automobiles, and food. Each of these photographs may then be analyzed.

According to at least one embodiment, the analyzed features may be the objects themselves. For example, the tiled image creation program 110A, 110B may, via object recognition, identify objects in the received photographs, and place each object into one or more ontologies. Continuing the example, the tiled image creation program 110A, 110B may identify an old model of a car made by one manufacturer in one photograph, and identify an old model of another car made by a different manufacturer in another photograph. Thus, in this example, the tiled image creation program 110A, 110B may determine antique cars are a known object of interest, described in further detail below with respect to step 206.

According to at least one other embodiment, the analyzed features may be zoom levels of the photographs. For example, the tiled image creation program 110A, 110B may recognize that the photographs are taken by the user at different zoom levels. Continuing the example, if a majority of the received photographs are taken at a zoom level of "1.0×" (i.e., a default zoom level) and a select few of automobiles are taken at a zoom level of "3.0×", then it may be determined that the user is interested in automobiles, described in further detail below with respect to step 206.

Next, at 206, the tiled image creation program 110A, 110B identifies the one or more known objects of interest. The one or more known objects of interest are identified based on the analyzed features described above with respect to step 204. As used herein, "known objects of interest" are preferences of the user regarding objects that are inferred from the one or more received photographs. As described above with respect to step 204, the tiled image creation program 110A, 110B may perform image recognition analysis on the disproportionate number of photographs of the particular object and/or the photographs taken at a higher zoom level. For example, if 90% of the received photographs are photographs of mountain ranges, then mountain ranges may be identified as a known object of interest. In another example, if the user zooms-in on photographs of birds at a higher zoom level (e.g., the "3.0×" zoom level) than a default zoom level (i.e., the "1.0×" zoom level), then birds may be identified as a known object of interest.

According to at least one other embodiment, the one or more known objects of interest may be identified from text written by the user. If the user grants permission via a user interface (UI) on their device (e.g., smartphone or laptop), this written text may also be received by the tiled image creation program 110A, 110B along with the one or more photographs. Examples of written text include, but are not limited to, emails from the user, text messages from the user, and/or documents written by the user in a word processing program. For example, the user may host a blog discussing their opinion about automobiles. In this example, based on the frequent writings about automobiles, automobiles may be identified as a known object of interest. In another example, the user may often send text messages to their friends about birds they saw while walking through a park.

In this example, based on the text messages about birds, birds may also be identified as a known object of interest. The written text may be used in combination with the one or more photographs to identify the one or more known objects of interest, or the written text may be used in lieu of the one or more photographs.

According to at least one further embodiment, the one or more known objects of interest may be identified from online viewing activity of the user. As described above, if the user grants permission via the UI on their device, this online viewing activity of the user may also be received by the tiled image creation program 110A, 110B along with the one or more photographs and the written text. Examples of online viewing activity include, but are not limited to, browsing activity of the user, images viewed on mobile applications of the user, and/or social media activity of the user. For example, the user may frequently browse websites containing reviews of automobiles. In this example, based on the browsing history regarding automobile websites, automobiles may be identified as a known object of interest. In another example, the user may upload multiple photographs of birds on their social media profile. In this example, based on the social media activity of the user, birds may also be identified as a known object of interest. The online viewing activity may be used in combination with the one or more photographs and the written text to identify the one or more known objects of interest, or the online viewing activity may be used in lieu of the one or more photographs and the written text.

Then, at 208, the tiled image creation program 110A, 110B determines whether the user wants to take the tiled zoom photograph. As used herein, "tiled zoom photograph" means a photograph that is divided into subdivisions using a grid (i.e., tiles) and rendering each section of the grid separately. According to at least one embodiment, the determination may be made by presenting the user with an option, via the UI, to take the tiled zoom photograph with their photographic capture device. The response from the user may indicate that they would like to take the tiled zoom photograph, or that they would not like to take the tiled zoom photograph. Based on the context of a situation, the tiled image creation program 110A, 110B may learn from the responses of the user. For example, if the user responds several times that they would not like to take the tiled zoom photograph when they are in a park, the tiled image creation program 110A, 110B may learn from this response and not ask the user during a future visit to the park if they would like to take the tiled zoom photograph.

According to at least one other embodiment, if the user would like to take the tiled zoom photograph, the tiled image creation program 110A, 110B may suggest (e.g., via the UI and/or an audio prompt) that the user place the photographic capture device on a tripod or other stabilization device. It may also be recommended that the user does not move the photographic capture device for a specified period of time (e.g., five minutes). According to at least one further embodiment, the user may modify the specified period of time. For example, the user may change the specified period of time from five minutes to three minutes.

In response to determining the user wants to take the tiled zoom photograph (step 208, "Yes" branch), the automatic tiled image creation process 200 proceeds to step 210 to capture the photographic image. In response to determining the user does not want to take the tiled zoom photograph (step 208, "No" branch), the automatic tiled image creation process 200 ends.

Then, at 210, the tiled image creation program 110A, 110B captures the photographic image. As described above, the photographic image may be captured by the photographic capture device. According to at least one embodiment, the photographic image may be a wide-angle photographic image. As used herein, a "wide-angle" means a panoramic view (i.e., a photographic image captured with horizontally elongated fields of view). According to at least one embodiment, the photographic image may be captured manually by the user. According to at least one other embodiment, the photographic image may be captured automatically when the photographic capture device is mounted on the stabilization device described above with respect to step 208. For example, the photographic image may be a photograph captured in an unobstructed environment. Continuing the example, the unobstructed environment may be on a beach viewing a large body of water. In another example, the unobstructed environment may be a point of high altitude, such as the top of a skyscraper or cliff. It may be appreciated that the examples described above are not intended to be limiting, and that in embodiments of the present invention the photographic image may be captured in any surrounding environment.

According to at least one further embodiment, the user may physically enter into the field of view of the photographic capture device. In this embodiment, an additional photographic image may be captured with the user in the photographic image. Using global positioning system (GPS) information associated with the photographic image and the additional photographic image, as well as the viewing direction of the user (e.g., toward the photographic capture device or away from the photographic capture device), this additional photographic image may be incorporated into the originally created tiled zoom photograph, described in further detail below with respect to step 218.

Next, at 212, the tiled image creation program 110A, 110B scans the photographic image for the identifying features of the one or more known objects of interest. As used herein, the "identifying features" are characteristics of the one or more known objects of interest. For example, if the known object of interest is a zebra, the photographic image may be scanned for alternating black and white stripes, indicating that a zebra may be present in the photographic image. In another example, if the known object of interest is an automobile, the photographic image may be scanned for grooves between structural parts (e.g., the groove between a driver-side door and a passenger-side door) and/or alternating heights in the structural parts (e.g., a roof of the automobile is situated higher than an engine compartment under a hood). It may be appreciated that the examples described above are not intended to be limiting, and that in embodiments of the present invention the photographic image may be scanned for a variety of different identifying features.

According to at least one embodiment, the photographic image may be scanned at low resolution for the identifying features. For example, low resolution may be a resolution of less than 300 dots per inch (DPI), and high resolution may be a resolution of 300 DPI or greater. By scanning at low resolution, only objects that bear characteristics in common with the one or more known objects of interest may be zoomed-in upon. It may be appreciated that the example described above is not intended to be limiting, and that in embodiments of the present invention the distinction between high resolution and low resolution may vary.

Then, at 214, the tiled image creation program 110A, 110B determines whether at least one object of interest is found in the scanned photographic image. The determination is made based on the one or more known objects of interest. As used herein, "objects of interest" are objects found in the scanned photographic image as opposed to the one or more received photographs described above with respect to step 202.

According to at least one embodiment, as described above with respect to step 212, the photographic image may be scanned at low resolution for the identifying features of the one or more known objects of interest, and these identifying features may be used to zoom-in on objects that bear characteristics in common with the one or more known objects of interest. Continuing the example above, if the known object of interest is an automobile, the tiled image creation program 110A, 110B may scan for the grooves between structural parts and/or the alternating heights in the structural parts. In this example, if the grooves and/or the alternating heights are found in an area of the photographic image, that area may be zoomed-in upon and the tiled image creation program 110A, 110B may perform object recognition analysis using known techniques to confirm that the object zoomed-in upon is in fact an object of interest. The areas may be zoomed-in upon at different zoom levels depending on the size of the object to ensure that the object fits within the field of view of the photographic capture device. In this manner, a high resolution image of the object of interest may be obtained.

According to at least one other embodiment, an actual size of an object in the real world may be utilized in addition to the one or more identifying features of the known objects of interest to determine whether the at least one object of interest is found in the scanned photographic image. For example, if the known object of interest is a giraffe, the tiled image creation program 110A, 110B may use a range in height of giraffes (e.g., 15-20 feet) in the real world to rule out objects of larger size, even if these larger objects resemble the giraffe. In this embodiment, visual parallax may be used to estimate the actual size of an object in a focal plane of the photographic capture device. Details on the use of visual parallax are described in further detail below with respect to FIGS. 3 and 4.

In response to determining the at least one object of interest is not found (step 214, "No" branch), the automatic tiled image creation process 200 proceeds to step 216 to discard the zoomed-in area where the at least one object of interest is not found. In response to determining the at least one object of interest is found (step 214, "Yes" branch), the automatic tiled image creation process 200 retains the zoomed-in image of the object of interest and proceeds to step 218 to assemble the tiled zoom photograph with the plurality of tiles.

Next, at 216, the tiled image creation program 110A, 110B discards the zoomed-in area where the at least one object of interest is not found. As used herein, "discard" means a zoomable tile is not created for this portion of the photographic image. As described above with respect to step 214, the identifying features of the one or more known objects of interest may be used to zoom-in on objects that bear characteristics in common with the one or more known objects of interest. If, after performing the object recognition analysis, the object is not confirmed to be an object of interest, that area zoomed-in upon and the image of the object in that area may be discarded. In this embodiment, a high resolution image of the object may not be rendered.

Then, at 218, the tiled image creation program 110A, 110B assembles the tiled zoom photograph with the plurality of tiles. Each tile of the plurality of tiles may include a zoomed photograph of each object of interest, or a collection of multiple objects of interest if the objects of interest are sufficiently proximal. In embodiments of the present invention, a plurality of zoomed photographs may be captured at multiple zoom levels for each object of interest, or the collection of multiple objects of interest that are sufficiently proximal. When the at least one object of interest is found, the tiled image creation program 110A, 110B obtains the zoomed photograph of each object of interest, and these zoomed photographs are associated with the plurality of tiles. As described above with respect to step 208, the tiled zoom photograph may be a photograph that is divided into subdivisions using a grid (i.e., tiles) and rendering each section of the grid separately. Since different users may have different preferences with regard to objects of interest, the plurality of tiles may focus on the one or more known objects of interest for each individual user. For example, if the known object of interest for one user is an automobile, the plurality of tiles may be overlayed on an area of the photographic image that depicts an automobile. Contrarily, if the known object of interest for another user is a bird, the plurality of tiles may be overlayed on an area of the photographic image that depicts a bird. In embodiments of the present invention, the overlayed plurality of tiles may be zoomable, described in further detail below with respect to step 220.

According to at least one other embodiment, in addition to creating tiled zoom photographs of scenes, these tiled zoom photographs may be used in different environments as well. For example, one additional environment may be a research laboratory, and in particular a microscope within the laboratory. Continuing the example, if the user is a scientist, the one or more known objects of interest may be ribosomes and/or mitochondria. Thus, the overlayed plurality of tiles may focus on the ribosomes and/or the mitochondria. In another example, an additional environment may be a manufacturing facility. Continuing the example, if the user is an inspector, the one or more known objects of interest may be products on a conveyor belt. Thus, the overlayed plurality of tiles may focus on the products such that any defects in the materials may be detected prior to shipment. It may be appreciated that the examples described above are not intended to be limiting, and that in embodiments of the present invention the tiled zoom photographs may be created in a variety of different environments.

Next, at 220, the tiled image creation program 110A, 110B presents the tiled zoom photograph with the plurality of tiles to the user. The tiled zoom photograph with the plurality of tiles may be presented to the user in a photo gallery on one or more devices of the user (e.g., a smartphone, tablet, or laptop) and/or a photo gallery on the photographic capture device. The tiled zoom photograph may be created in such a manner that each tile of the plurality of tiles that is available for zooming-in may be presented to the user with an indication that the tile is zoomable. According to at least one embodiment, the indication may be a faint outline of the rectangles of the tiles that are available for zooming. According to at least one other embodiment, when the user swipes over the tiled zoom photograph with their finger (e.g., when viewing the photograph on a smartphone or tablet), or moves over the tiled zoom photograph with a mouse (e.g., when viewing the photograph on a laptop or desktop computer), the indication may be a highlight of the rectangles of the tiles that are available for zooming at the moment the user hovers over the tiles with their finger or mouse. When the user zooms-in on the tiles that are available for zooming, the user may view the objects of interest within the available tiles as a high resolution image.

Then, at 222, the tiled image creation program 110A, 110B receives the feedback about the tiled zoom photograph from the user. As described above with respect to step 220, the user may swipe over the tiled zoom photograph with their finger or move over the tiled zoom photograph with the mouse.

According to at least one embodiment, the feedback about the tiled zoom photograph may be in the form of explicit feedback. The feedback may be positive or negative. For example, the user may provide oral and/or written feedback via the UI on their device. Continuing the example, the user may find a tile that they are interested in, but the object of interest in the tile may not be presented at high resolution. In this example, the user may specify that the object of interest was not rendered in high resolution, and the tiled image creation program 110A, 110B may learn from the feedback and in the future capture the object of interest at a modified zoom level. In another example, the object of interest in the tile may be presented at high resolution. In this example, the user may specify that the object of interest was rendered in high resolution, and the tiled image creation program 110A, 110B may learn from the feedback and in the future capture the object of interest at the same zoom level.

According to at least one other embodiment, the feedback about the tiled zoom photograph may be in the form of implicit feedback. As described above, the feedback may be positive or negative. For example, the user may copy the zoomed photograph associated with a tile with the presumed intent of pasting the zoomed photograph associated with the tile into another application. In this embodiment, the zoomed photograph that is copied by the user may be interpreted as implicit positive feedback that the tiled zoom photograph contains the at least one object of interest. Thus, the tiled image creation program 110A, 110B may learn from the feedback regarding whether the tiled zoom photograph is interesting or not. In another example, the user may discard the zoomed photograph associated with a tile (e.g., by pressing a delete button). In this embodiment, each zoomed photograph associated with the tile that is discarded by the user may be interpreted as implicit negative feedback that the tiled zoom photograph does not contain the at least one object of interest. Thus, the tiled image creation program 110A, 110B may learn from the feedback and in the future capture an object the user found interesting.

Figure 3:
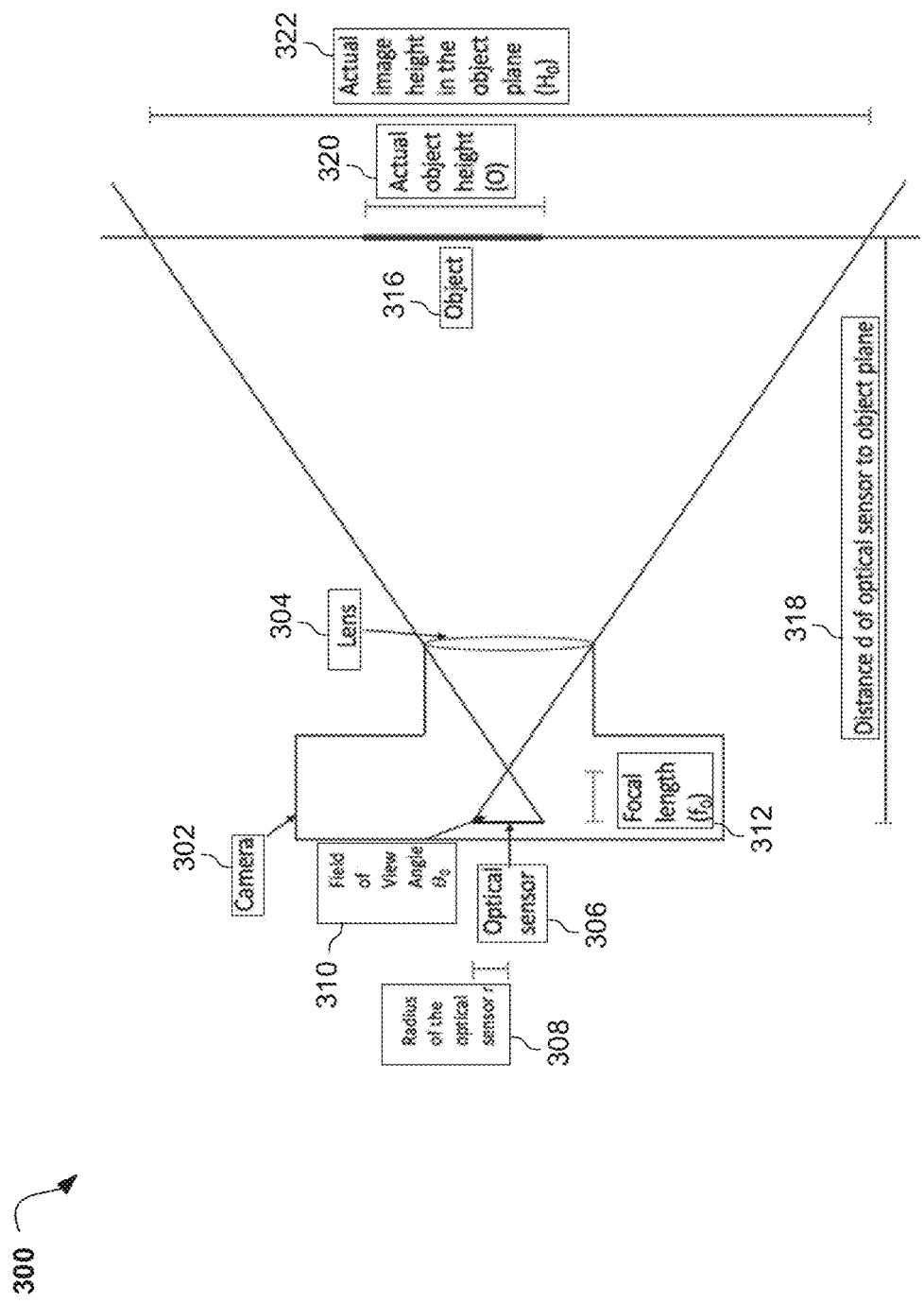
FIG. 3 is a diagram depicting a camera with an optical sensor in an initial position according to at least one embodiment.

Referring now to FIG. 3, a diagram 300 depicting a camera with an optical sensor in an initial position is shown according to at least one embodiment. The diagram 300 is an example of how visual parallax may be used to estimate the actual size of an object in a focal plane of the photographic capture device. The camera 302 may have a lens 304 and an optical sensor 306. As described above, the optical sensor 306 may be in the initial position. The optical sensor 306 may have a radius r 308. A field of view angle $\theta_0$ 310 of the lens 304 with the optical sensor 306 in the initial position is depicted and a focal length $f_0$ 312 illustrates a distance from a center of the lens 304 to the optical sensor 306. An object 316 may appear within the field of view angle $\theta_0$ 310 and a distance d 318 of the optical sensor 306 to the object 316 is illustrated. The object 316 may have an actual real-world height O 320 and the image in which the object 316 is included has an actual real-world height $H_O$ 322. Thus, the governing equations with the optical sensor 306 in the initial position are as follows:

$$\theta_0 = \tan^{-1}\left(\frac{f_0}{r}\right) \quad (1)$$

$$\tan\theta_0 = \frac{d}{\frac{H_0}{2}+r}$$

so that $$\frac{f_0}{r} = \frac{d}{\frac{H_0}{2}+r}$$

Figure 4:
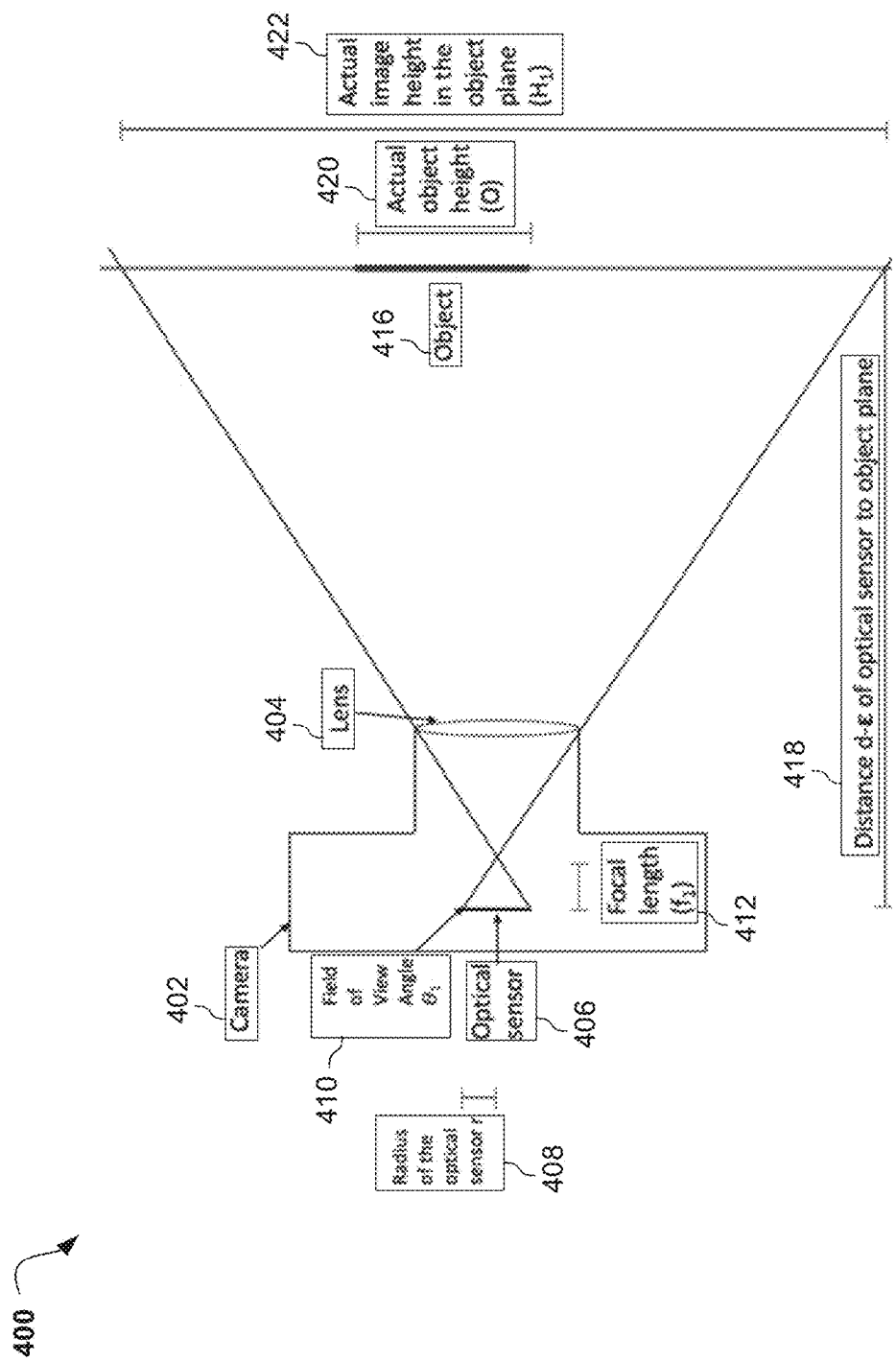
FIG. 4 is a diagram depicting the camera in FIG. 3 with the optical sensor in a second position according to at least one embodiment.

Referring now to FIG. 4, a diagram 400 depicting the camera in FIG. 3 with the optical sensor in a second position is shown according to at least one embodiment. The diagram 400 is an example of how visual parallax may be used to estimate the actual size of an object in a focal plane of the photographic capture device. The camera 402 may have a lens 404 and an optical sensor 406. As described above, the optical sensor 406 may be in the second position. The optical sensor 406 may have a radius r 408. A field of view angle $\theta_1$ 410 of the lens 404 with the optical sensor 406 in the second position is depicted and a focal length $f_1$ 412 illustrates a distance from a center of the lens 404 to the optical sensor 406. An object 416 may appear within the field of view angle $\theta_1$ 410 and a distance d–ε 418 of the optical sensor 406 to the object 416 is illustrated. The object 416 may have an actual real-world height O 420 and the image in which the object 416 is included has an actual real-world height $H_1$ 422. Thus, the governing equations with the optical sensor 406 in the second position are as follows:

$$\theta_1 = \tan^{-1}\left(\frac{f_1}{r}\right) \quad (2)$$

$$\tan\theta_0 = \frac{d-\epsilon}{\frac{H_1}{2}+r}$$

so that $$\frac{f_1}{r} = \frac{d-\epsilon}{\frac{H_1}{2}+r}$$

Since the object 316 in FIG. 3 and the object 416 in FIG. 4 are contained in each of the images (i.e., the image captured with the optical sensor 306 in the initial position and the image captured with the optical sensor 406 in the second position), a scaling factor A may be determined by image analysis. Thus, the equations above become:

$$\frac{f_0}{r} = \frac{d}{\frac{\lambda H_1}{2}+r},$$

$$\frac{f_1}{r} = \frac{d-\epsilon}{\frac{H_1}{2}+r}$$

In this embodiment, the variables $f_0$ 312, $f_1$ 412, r 308, 408, ε (i.e., the distance the optical sensor 406 was moved forward), and Δ are known constants. Therefore, the two unknowns d and $H_1$ may be solved. Once $H_1$ is solved, the framing rectangle of the object of interest described above with respect to FIGS. 2A and 2B may be obtained along with an associated fraction F of the image captured with the optical sensor 406 in the second position that the height of the rectangle represents. Then, the actual real-world height $H_1$ 422 of the image captured with the optical sensor 406 in the second position may be calculated as follows: F×($H_1$).

Figure 5A:
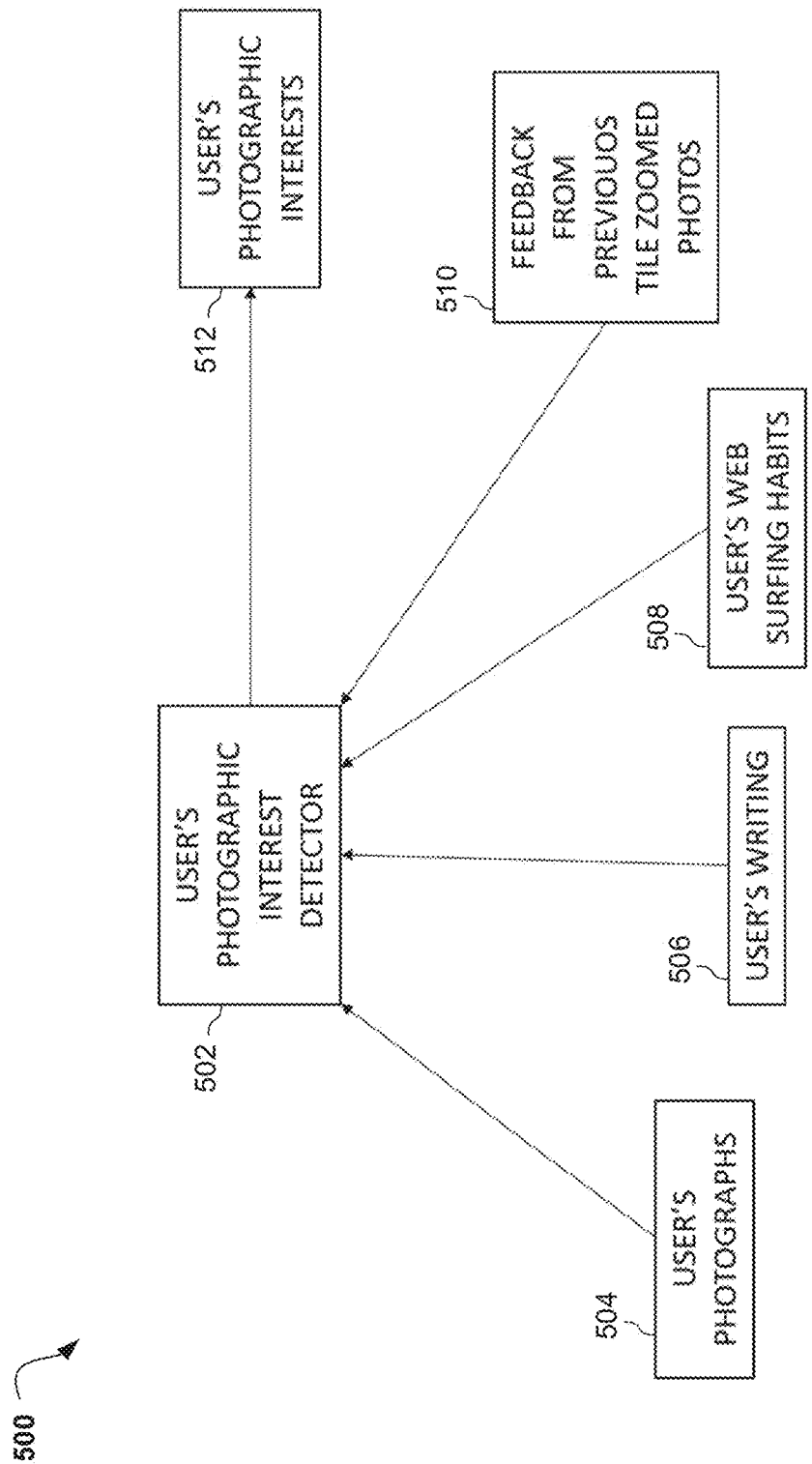
FIGS. 5A and 5B are a diagram depicting an interaction between solution components of the process in FIGS. 2A and 2B according to at least one embodiment.
Figure 5B:
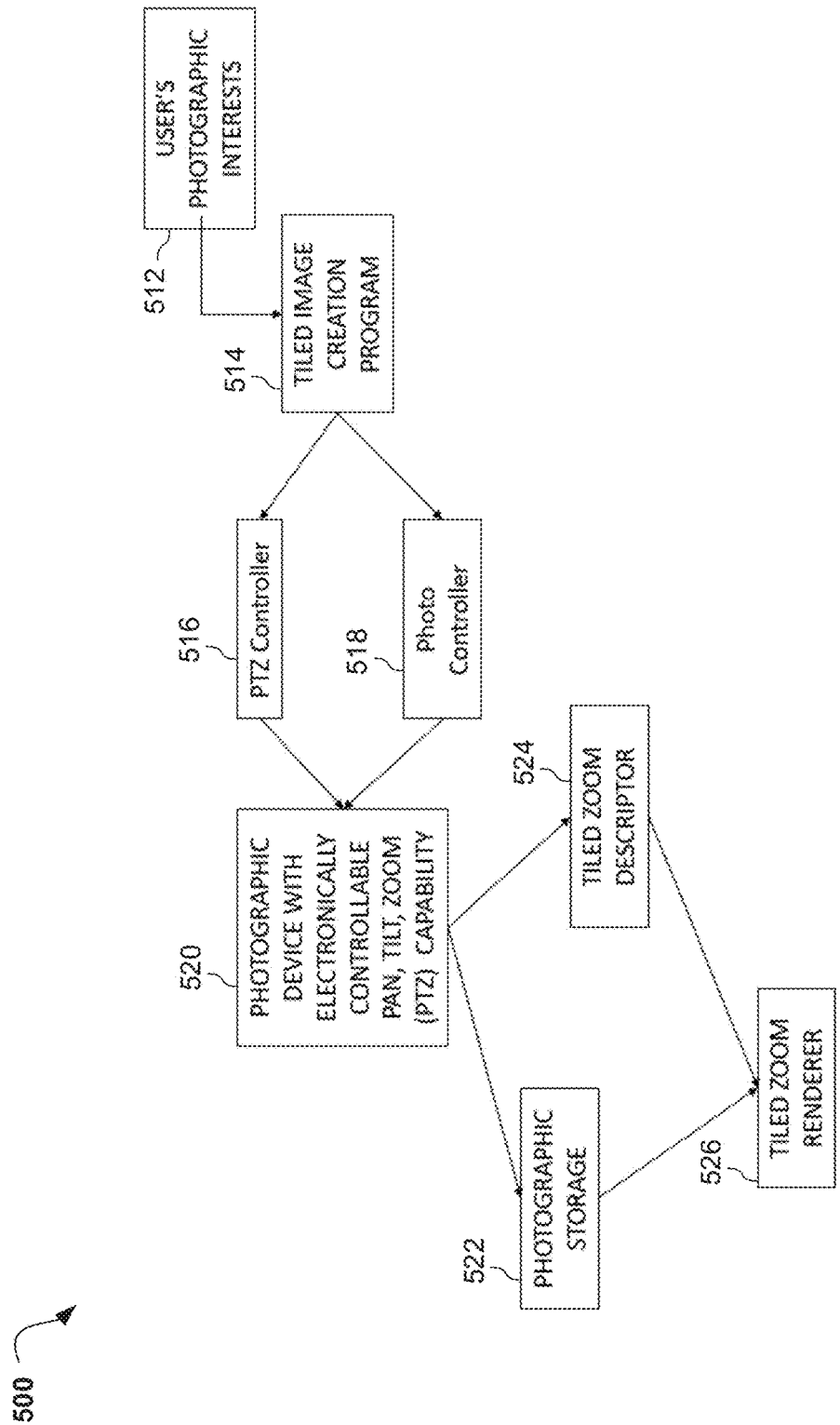

Referring now to FIGS. 5A and 5B, a diagram 500 depicting an interaction between solution components of the process in FIGS. 2A and 2B is shown according to at least one embodiment. In the diagram 500, a user's photographic interest detector 502 may receive as input a user's photographs 504, a user's writing 506, a user's web surfing habits 508, and a user's feedback from previous tiled zoom photographs 510. Based on these inputs, the output of the user's photographic interest detector 502 may be a user's photographic interests 512 (i.e., the one or more known objects of interest described above with respect to FIGS. 2A and 2B).

The tiled image creation program 514, of which the user's photographic interest detector 502 may be a functional module, may further be configured to control a photographic capture device, such as a camera, by sending a trigger to a pan/tilt/zoom (PTZ) controller 516 and a photo controller 518. The tiled image creation program 514 may be a part of the photographic capture device, or may be hosted on a separate device, such as the client computing device 102 and the server 112. According to at least one embodiment, the photographic capture device may be a photographic device with an electronically controllable PTZ capability 520. The photographic device with an electronically controllable PTZ capability 520 may capture a photographic image (e.g., a wide-angle photographic image), which may be stored, either locally or via network storage, in a photographic storage repository 522. Tiled zoom descriptor files 524, which describe magnification levels of the plurality of tiles along with where in the larger photographic image the plurality of tiles reside, may also be stored as data associated with the photographic image. An example of the tiled zoom descriptor files 524 is illustrated below with respect to FIGS. 7A-7C. Based on the tiled zoom descriptor files 524, a tiled zoom renderer 526, which may also be a functional module of the tiled image creation program 514, may be utilized to assemble the tiled zoom photograph with the plurality of tiles.

Figure 6:
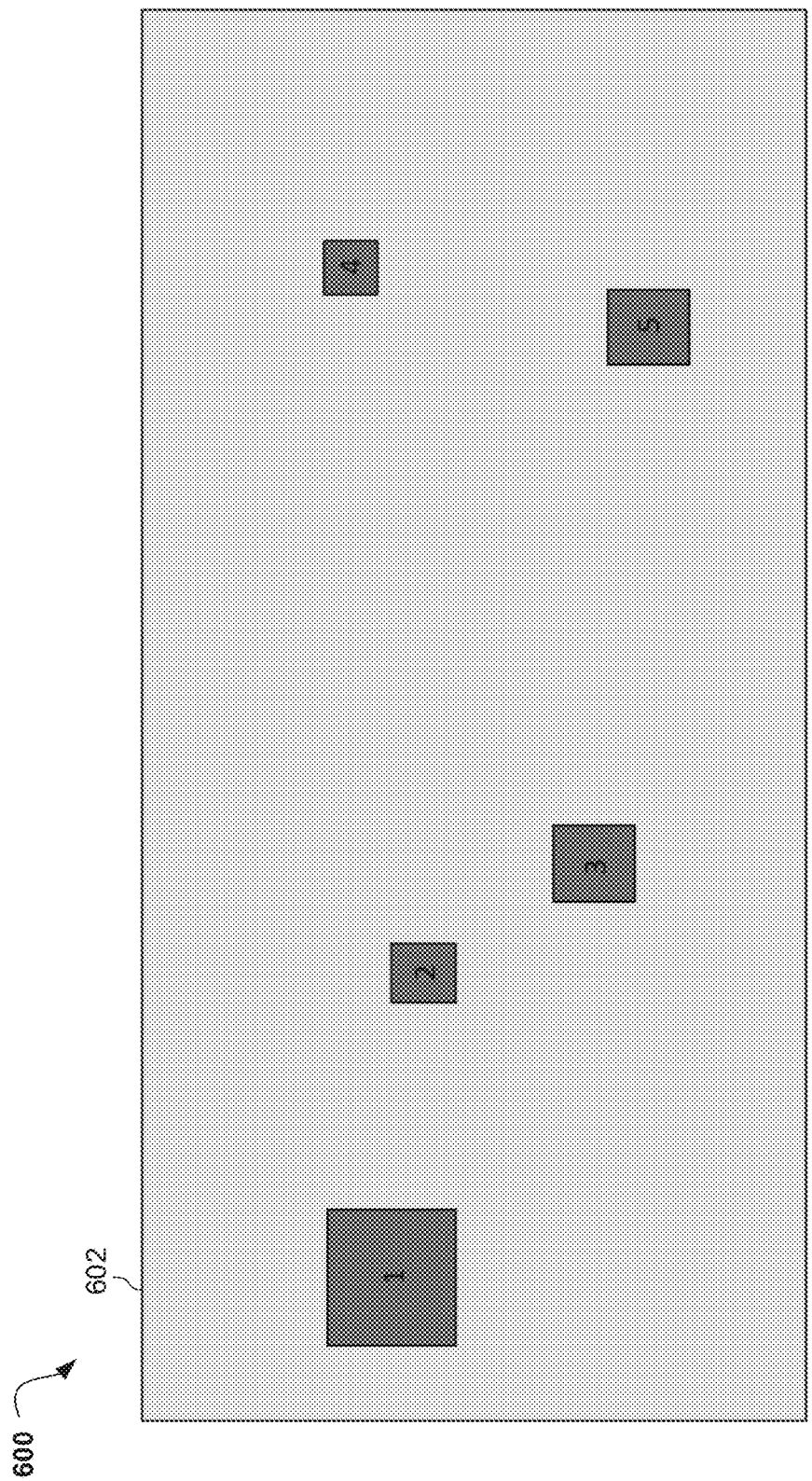
FIG. 6 is a diagram depicting a tiled zoom photograph with a plurality of tiles according to at least one embodiment.

Referring now to FIG. 6, a diagram 600 depicting a tiled zoom photograph with a plurality of tiles is shown according to at least one embodiment. In the diagram 600, the photographic image 602 (e.g., a wide-angle photographic image) captured by the photographic capture device is shown. This photographic image 602 may be overlayed with the plurality of tiles. For example, the plurality of tiles may include five tiles (i.e., Tile 1, Tile 2, Tile 3, Tile 4, and Tile 5). As described above with respect to FIGS. 2A and 2B, each tile of the plurality of tiles may include a zoomed photograph of each object of interest, or a collection of multiple objects of interest if the objects of interest are sufficiently proximal, and a plurality of zoomed photographs may be captured at multiple zoom levels for each object of interest, or the collection of multiple objects of interest that are sufficiently proximal. Continuing the example above, since Tile 1 is larger than Tiles 2-5, Tile 1 may contain the collection of multiple objects of interest, and Tiles 2-5 may contain a single object of interest. It may be appreciated that the example described above is not intended to be limiting, and that in embodiments of the present invention each of Tiles 1-5 may contain either a single object of interest or a collection of multiple objects of interest.

Figure 7C:
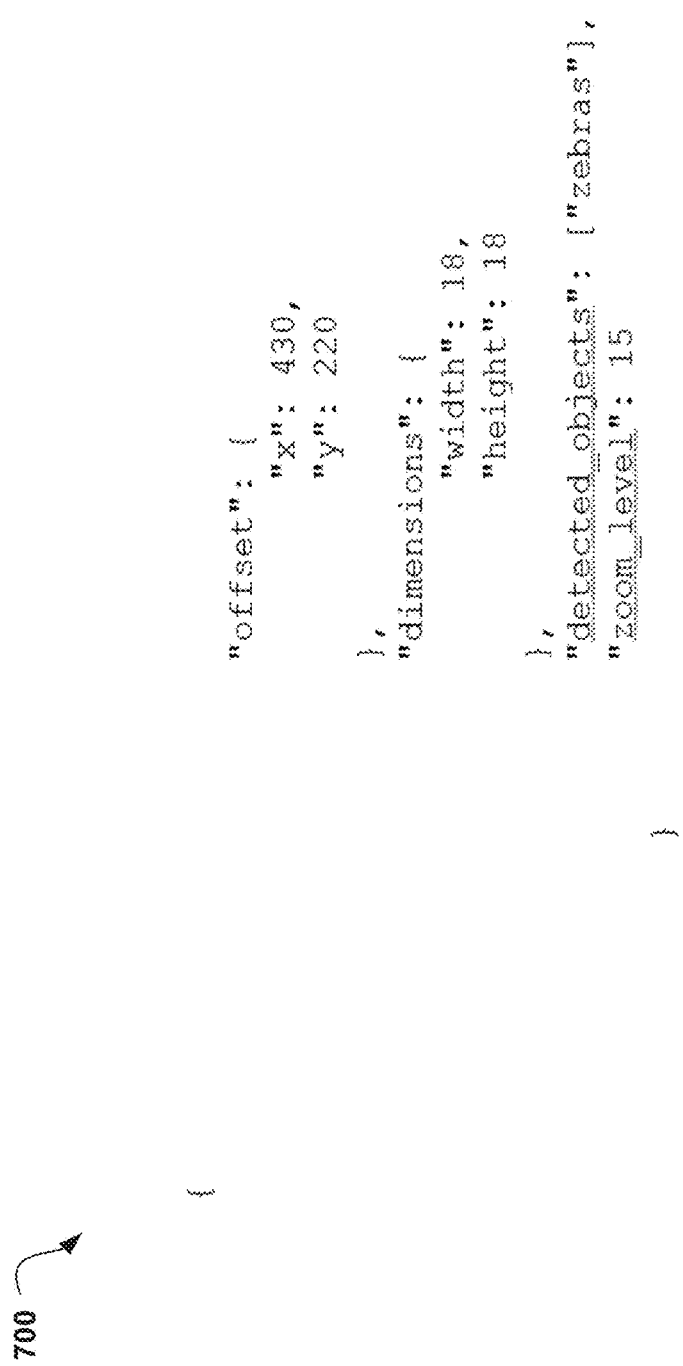

Referring now to FIGS. 7A, 7B, and 7C, a diagram 700 depicting a sample tiled zoom descriptor file of the tiled zoom descriptor component in FIG. 5B is shown according to at least one embodiment. As shown in the diagram 700, the sample tiled zoom descriptor file may contain such information including, but not limited to, magnification levels of the plurality of tiles, where in the larger photographic image the plurality of tiles reside, dimensions of the plurality of tiles, and/or detected objects of interest within the plurality of tiles. It may be appreciated that the diagram 700 is not intended to be limiting, and that in embodiments of the present invention the tiled zoom descriptor file may contain information additional or alternative to the information described above.

It may be appreciated that FIGS. 2A-2B, 3, 4, 5A-5B, 6, and 7A-7C provide only an illustration of one implementation and do not imply any limitations with regard to how different embodiments may be implemented. Many modifications to the depicted environments may be made based on design and implementation requirements.

Figure 8:
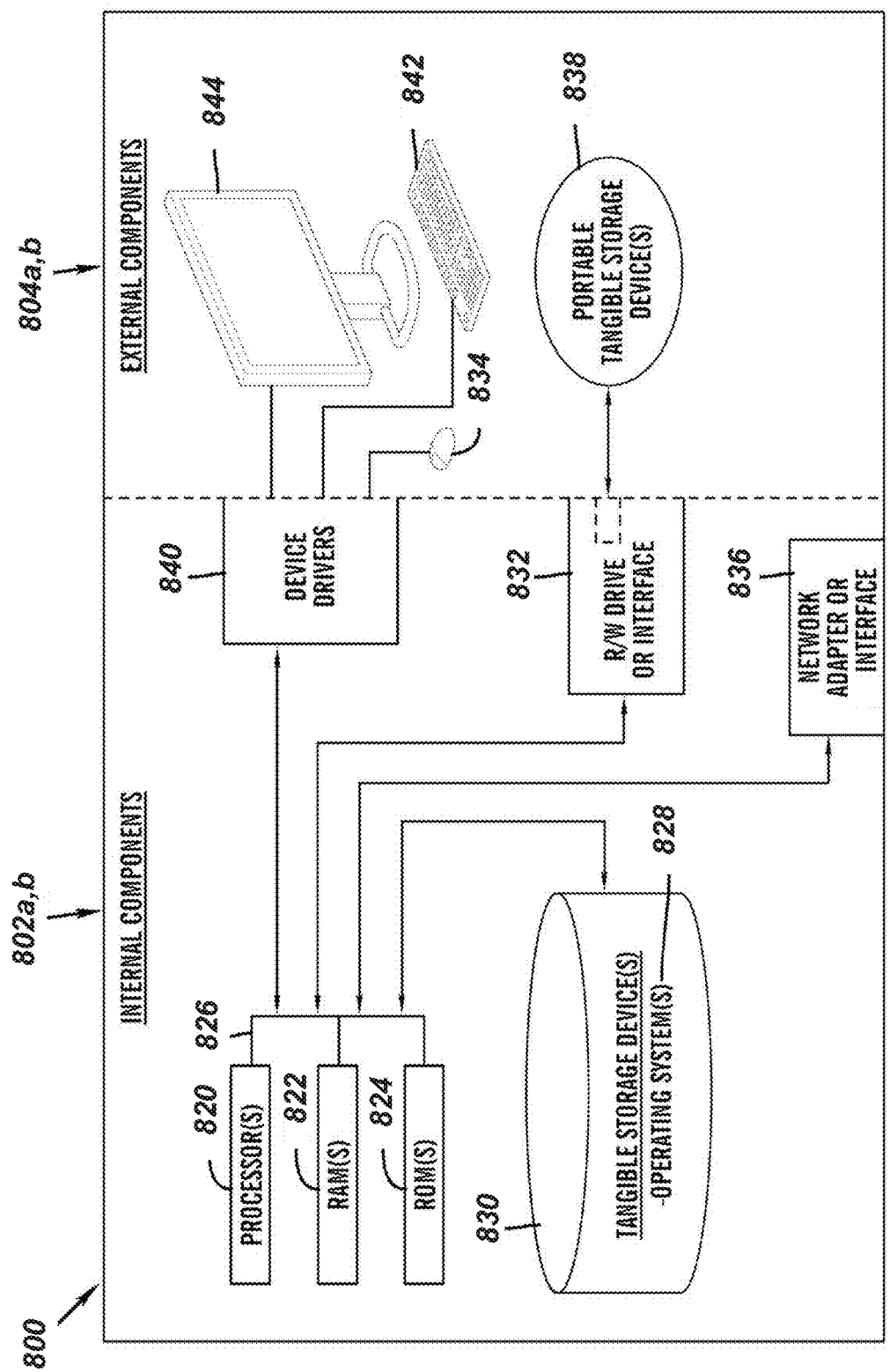
FIG. 8 is a functional block diagram of internal and external components of computers and servers depicted in FIG. 1 according to at least one embodiment.

FIG. 8 is a block diagram 800 of internal and external components of the client computing device 102 and the server 112 depicted in FIG. 1 in accordance with an embodiment of the present invention. It should be appreciated that FIG. 8 provides only an illustration of one implementation and does not imply any limitations with regard to the environments in which different embodiments may be implemented. Many modifications to the depicted environments may be made based on design and implementation requirements.

The data processing system 802, 804 is representative of any electronic device capable of executing machine-readable program instructions. The data processing system 802, 804 may be representative of a smart phone, a computer system, PDA, or other electronic devices. Examples of computing systems, environments, and/or configurations that may be represented by the data processing system 802, 804 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The client computing device 102 and the server 112 may include respective sets of internal components 802 *a,b* and external components 804 *a,b* illustrated in FIG. 8. Each of the sets of internal components 802 include one or more processors 820, one or more computer-readable RAMs 822, and one or more computer-readable ROMs 824 on one or more buses 826, and one or more operating systems 828 and one or more computer-readable tangible storage devices 830. The one or more operating systems 828, the software program 108 and the tiled image creation program 110A in the client computing device 102 and the tiled image creation program 110B in the server 112 are stored on one or more of the respective computer-readable tangible storage devices 830 for execution by one or more of the respective processors 820 via one or more of the respective RAMs 822 (which typically include cache memory). In the embodiment illustrated in FIG. 8, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 802 *a,b* also includes a R/W drive or interface 832 to read from and write to one or more portable computer-readable tangible storage devices 838 such as a CD-ROM, DVD, memory stick, magnetic tape, magnetic disk, optical disk or semiconductor storage device. A software program, such as the tiled image creation program 110A, 110B, can be stored on one or more of the respective portable computer-readable tangible storage devices 838, read via the respective R/W drive or interface 832, and loaded into the respective hard drive 830.

Each set of internal components 802 *a,b* also includes network adapters or interfaces 836 such as a TCP/IP adapter cards, wireless Wi-Fi interface cards, or 3G or 4G wireless interface cards or other wired or wireless communication links. The software program 108 and the tiled image creation program 110A in the client computing device 102 and the tiled image creation program 110B in the server 112 can be downloaded to the client computing device 102 and the server 112 from an external computer via a network (for example, the Internet, a local area network or other, wide area network) and respective network adapters or interfaces 836. From the network adapters or interfaces 836, the software program 108 and the tiled image creation program 110A in the client computing device 102 and the tiled image creation program 110B in the server 112 are loaded into the respective hard drive 830. The network may comprise copper wires, optical fibers, wireless transmission, routers, firewalls, switches, gateway computers and/or edge servers.

Each of the sets of external components 804 *a,b* can include a computer display monitor 844, a keyboard 842, and a computer mouse 834. External components 804 *a,b* can also include touch screens, virtual keyboards, touch pads, pointing devices, and other human interface devices. Each of the sets of internal components 802 a,b also includes device drivers 840 to interface to computer display monitor 844, keyboard 842, and computer mouse 834. The device drivers 840, R/W drive or interface 832, and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 9:
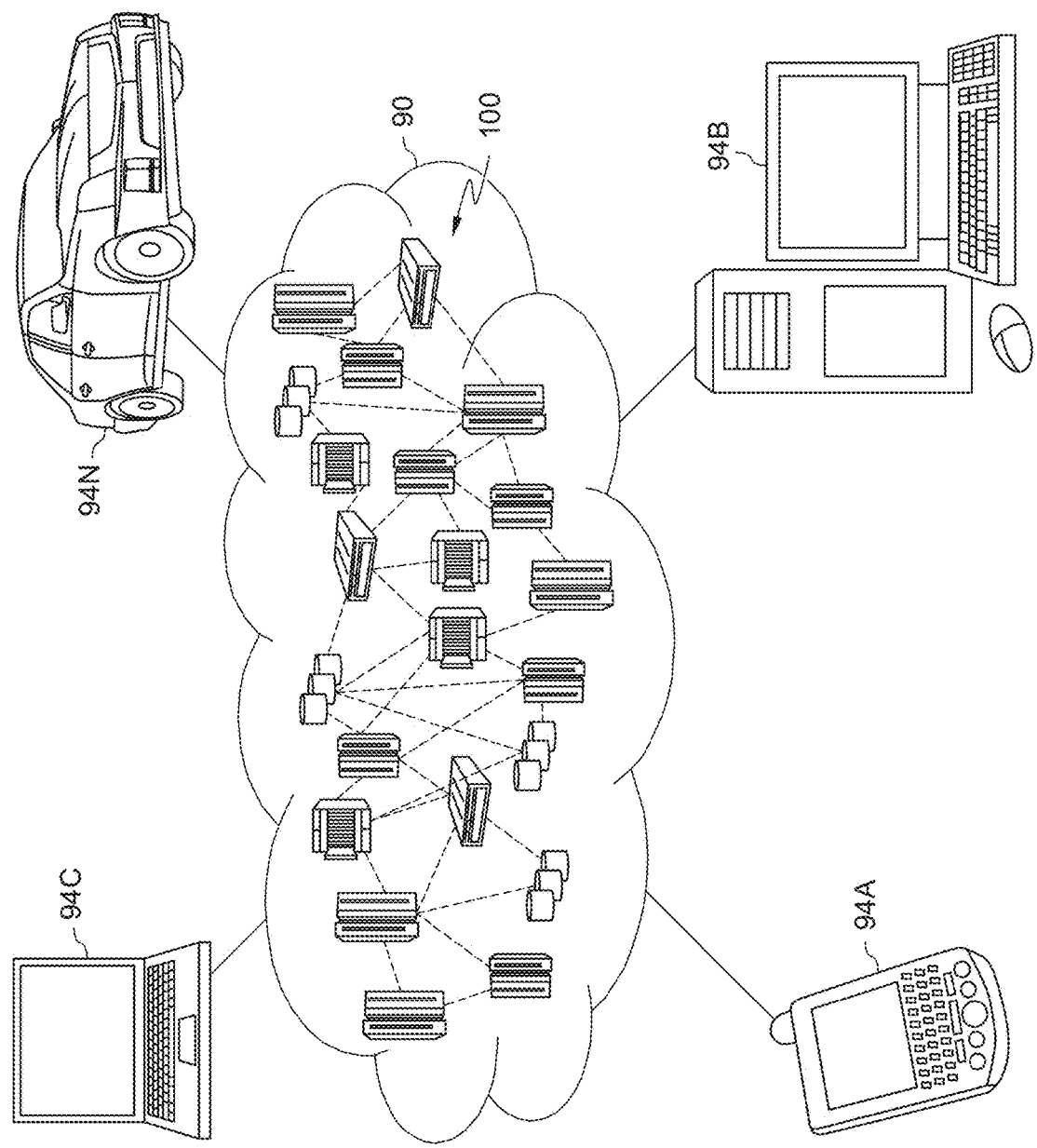
FIG. 9 depicts a cloud computing environment according to an embodiment of the present invention.

Referring now to FIG. 9, illustrative cloud computing environment 90 is depicted. As shown, cloud computing environment 90 comprises one or more cloud computing nodes 100 with which local computing devices used by cloud consumers, such as, for example, personal digital assistant (PDA) or cellular telephone 94A, desktop computer 94B, laptop computer 94C, and/or automobile computer system 94N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 90 to offer infrastructure, platforms and/or software as services for which a cloud consumer does not need to maintain resources on a local computing device. It is understood that the types of computing devices 94A-N shown in FIG. 9 are intended to be illustrative only and that computing nodes 100 and cloud computing environment 90 can communicate with any type of computerized device over any type of network and/or network addressable connection (e.g., using a web browser).

Referring now to FIG. 10, a set of functional abstraction layers 1000 provided by cloud computing environment 90 is shown. It should be understood in advance that the components, layers, and functions shown in FIG. 10 are intended to be illustrative only and embodiments of the invention are not limited thereto. As depicted, the following layers and corresponding functions are provided:

Hardware and software layer 6000 includes hardware and software components. Examples of hardware components include: mainframes 6100; RISC (Reduced Instruction Set Computer) architecture based servers 6200; servers 6300; blade servers 6400; storage devices 6500; and networks and networking components 6600. In some embodiments, software components include network application server software 6700 and database software 6800.

Virtualization layer 7000 provides an abstraction layer from which the following examples of virtual entities may be provided: virtual servers 7100; virtual storage 7200; virtual networks 7300, including virtual private networks; virtual applications and operating systems 7400; and virtual clients 7500.

In one example, management layer 8000 may provide the functions described below. Resource provisioning 8100 provides dynamic procurement of computing resources and other resources that are utilized to perform tasks within the cloud computing environment. Metering and Pricing 8200 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 8300 provides access to the cloud computing environment for consumers and system administrators. Service level management 8400 provides cloud computing resource allocation and management such that required service levels are met. Service Level Agreement (SLA) planning and fulfillment 8500 provide pre-arrangement for, and procurement of, cloud computing resources for which a future requirement is anticipated in accordance with an SLA.

Workloads layer 9000 provides examples of functionality for which the cloud computing environment may be utilized. Examples of workloads and functions which may be provided from this layer include: mapping and navigation 9100; software development and lifecycle management 9200; virtual classroom education delivery 9300; data analytics processing 9400; transaction processing 9500; and creating a tiled image using different zoom levels based on user interests 9600. Creating a tiled image using different zoom levels based on user interests 9600 may relate to assembling a tiled zoom photograph of a photographic image based on objects of interest in order to present the tiled zoom photograph to the user.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of creating a tiled image using different zoom levels based on user interests, the method comprising:
   receiving one or more photographs captured by a user;
   analyzing features associated with the one or more photographs;
   identifying one or more known objects of interest based on the analyzed features;
   determining whether the user wants to take a tiled zoom photograph;
   in response to determining the user wants to take the tiled zoom photograph, capturing a photographic image; and
   scanning the captured photographic image for identifying features of the one or more known objects of interest, wherein the scanning further comprises zooming in on at least one object in the captured photographic image having characteristics in common with the one or more known objects of interest.

2. The computer-based method of claim 1, further comprising:
   determining whether at least one object of interest is found in the scanned photographic image; and
   in response to determining the at least one object of interest is found, assembling the tiled zoom photograph with a plurality of tiles, each tile including a zoomed photograph of each object of interest.

3. The computer-based method of claim 2, further comprising:
   presenting the tiled zoom photograph with the plurality of tiles to the user; and
   receiving feedback about the tiled zoom photograph from the user.

4. The computer-based method of claim 1, wherein identifying the one or more known objects of interest further comprises:
   receiving text written by the user; and
   identifying the one or more known objects of interest based on the received text.

5. The computer-based method of claim 1, wherein the photographic image is scanned at low resolution.

6. The computer-based method of claim 3, wherein each tile of the plurality of tiles that is available for zooming-in is presented to the user with an indication that the tile is zoomable.

7. The computer-based method of claim 6, wherein each zoomed photograph associated with a tile of the plurality of tiles that is copied by the user is interpreted as implicit positive feedback that the tiled zoom photograph contains the at least one object of interest.

8. A computer system, the computer system comprising:
   one or more processors, one or more computer-readable memories, one or more computer-readable tangible storage medium, and program instructions stored on at least one of the one or more computer-readable tangible storage medium for execution by at least one of the one or more processors via at least one of the one or more computer-readable memories, wherein the computer system is capable of performing a method comprising:
   receiving one or more photographs captured by a user;
   analyzing features associated with the one or more photographs;
   identifying one or more known objects of interest based on the analyzed features;
   determining whether the user wants to take a tiled zoom photograph;
   in response to determining the user wants to take the tiled zoom photograph, capturing a photographic image; and
   scanning the captured photographic image for identifying features of the one or more known objects of interest, wherein the scanning further comprises zooming in on at least one object in the captured photographic image having characteristics in common with the one or more known objects of interest.

9. The computer system of claim 8, further comprising:
   determining whether at least one object of interest is found in the scanned photographic image; and
   in response to determining the at least one object of interest is found, assembling the tiled zoom photograph with a plurality of tiles, each tile including a zoomed photograph of each object of interest.

10. The computer system of claim 9, further comprising:
    presenting the tiled zoom photograph with the plurality of tiles to the user; and
    receiving feedback about the tiled zoom photograph from the user.

11. The computer system of claim 8, wherein identifying the one or more known objects of interest further comprises:
    receiving text written by the user; and
    identifying the one or more known objects of interest based on the received text.

12. The computer system of claim 8, wherein the photographic image is scanned at low resolution.

13. The computer system of claim 10, wherein each tile of the plurality of tiles that is available for zooming-in is presented to the user with an indication that the tile is zoomable.

14. The computer system of claim 13, wherein each zoomed photograph associated with a tile of the plurality of tiles that is copied by the user is interpreted as implicit positive feedback that the tiled zoom photograph contains the at least one object of interest.

15. A computer program product, the computer program product comprising:
    one or more computer-readable tangible storage medium and program instructions stored on at least one of the one or more computer-readable tangible storage medium, the program instructions executable by a processor capable of performing a method, the method comprising:
    receiving one or more photographs captured by a user;

analyzing features associated with the one or more photographs;

identifying one or more known objects of interest based on the analyzed features;

determining whether the user wants to take a tiled zoom photograph;

in response to determining the user wants to take the tiled zoom photograph, capturing a photographic image; and scanning the captured photographic image for identifying features of the one or more known objects of interest, wherein the scanning further comprises zooming in on at least one object in the captured photographic image having characteristics in common with the one or more known objects of interest.

16. The computer program product of claim 15, further comprising:

determining whether at least one object of interest is found in the scanned photographic image; and in response to determining the at least one object of interest is found, assembling the tiled zoom photograph with a plurality of tiles, each tile including a zoomed photograph of each object of interest.

17. The computer program product of claim 16, further comprising:

presenting the tiled zoom photograph with the plurality of tiles to the user; and receiving feedback about the tiled zoom photograph from the user.

18. The computer program product of claim 15, wherein identifying the one or more known objects of interest further comprises:

receiving text written by the user; and identifying the one or more known objects of interest based on the received text.

19. The computer program product of claim 15, wherein the photographic image is scanned at low resolution.

20. The computer program product of claim 17, wherein each tile of the plurality of tiles that is available for zooming-in is presented to the user with an indication that the tile is zoomable.

* * * * *